(12) United States Patent
Schöb

(10) Patent No.: US 6,559,567 B2
(45) Date of Patent: May 6, 2003

(54) ELECTROMAGNETIC ROTARY DRIVE

(75) Inventor: Reto Schöb, Volketswil (CH)

(73) Assignee: Levitronix LLC, Waltham, MA (US)

( * ) Notice: Subject to any disclaimer, the term of this patent is extended or adjusted under 35 U.S.C. 154(b) by 0 days.

(21) Appl. No.: 09/853,431

(22) Filed: May 10, 2001

(65) Prior Publication Data

US 2002/0047401 A1 Apr. 25, 2002

(30) Foreign Application Priority Data

May 12, 2000 (EP) .............................................. 00810407

(51) Int. Cl.[7] .................................................. H02K 7/09
(52) U.S. Cl. ................................. 310/90.5; 310/156.01
(58) Field of Search ............................. 310/90.5, 156.01

(56) References Cited

U.S. PATENT DOCUMENTS

| | | | | |
|---|---|---|---|---|
| 2,777,105 A | * | 1/1957 | Larsen ......................... | 318/748 |
| 5,424,595 A | | 6/1995 | Preston ....................... | 310/90.5 |
| 6,053,705 A | | 4/2000 | Schoeb ....................... | 310/90.5 |
| 6,130,494 A | * | 10/2000 | Schob ......................... | 310/90.5 |
| 6,351,048 B1 | * | 2/2002 | Schob et al. ................ | 310/90.5 |

FOREIGN PATENT DOCUMENTS

| | | |
|---|---|---|
| EP | 0566806 A1 | 10/1993 |
| EP | 0768750 A1 | 4/1997 |
| EP | 0939480 A2 | 9/1999 |
| WO | WO 95/18925 A1 | 7/1995 |
| WO | WO 96/31934 A1 | 10/1996 |

* cited by examiner

*Primary Examiner*—Burton S. Mullins
(74) *Attorney, Agent, or Firm*—Townsend and Townsend & Crew LLP

(57) ABSTRACT

An electromagnetic rotary drive, designed as bearingless motor, is proposed which comprises a magnetically journalled rotor (3) and a stator (2) which comprises a drive winding for producing a magnetic rotary drive field which produces a torque on the rotor (3), and a control winding for producing a magnetic rotary control field by means of which the position of the rotor (3) with respect to the stator (2) can be regulated, with the stator (2) having exactly six stator teeth (21).

10 Claims, 4 Drawing Sheets

ELECTROMAGNETIC ROTARY DRIVE

BACKGROUND OF THE INVENTION

The present invention generally relates to an electromagnetic rotary drive and more particularly to an electromagnetic rotary drive being designed as a bearingless motor.

The so-called bearingless motor is an electromagnetic rotary drive in which the rotor is journalled without contact with respect to the stator by means of magnetic forces, with no separate magnetic bearings being present for the rotor. In the active motor part, not only a torque but also a magnetic journalling force are produced. For this the stator is designed as a bearing and drive stator which comprises a drive winding for producing a drive field and a control winding for producing a control field. A magnetic rotary field can be produced with the drive and control winding which on the one hand exerts a torque on the rotor which causes its rotation and which on the other hand exerts a transverse force on the rotor which can be set as desired, so that its radial position can be actively controlled or regulated respectively.

SUMMARY OF THE INVENTION

In one embodiment of the present invention, an electromagnetic rotary drive which is designed as a bearingless motor in which both the drive field and the control field can be produced in the form of a magnetic rotary field and which is simpler, in particular in regard to its construction, than the known embodiments is proposed.

In accordance with an embodiment of the present invention, an electromagnetic rotary drive, designed as a bearingless motor, is proposed which comprises a magnetically journalled rotor and a stator which comprises a drive winding for producing a magnetic rotary drive field which produces a torque on the rotor, and a control winding for producing a magnetic rotary control field by means of which the position of the rotor with respect to the stator can be regulated, with the stator having exactly six stator teeth.

A rotary drive which is designed in accordance with the principle of the bearingless motor in which both the drive field and the control field can be generated in the form of rotary fields can be realized with only six stator teeth. The prior art had been that the minimum number of stator teeth for a bearingless motor of this kind amounts to eight. The reason for this is as follows: In accordance with the principle of the bearingless motor the numbers of pole pairs of the drive winding and of the control winding must differ by one, which means that in the minimum case one of the windings is bipolar and the other winding is quadrupolar. In order that a rotary field can be produced with each winding, each winding must be designed to be at least two-phased. In accordance with the known prior art the minimum number of stator teeth results from the product of the doubled number of pole pairs and the number of phases, and is consequently equal to eight.

Through embodiments of the present invention it is now proposed to realize a rotary drive of this kind with only six stator teeth. This brings about a considerable simplification of the entire rotary drive. Thus, for example, the construction of the stator and of the rotor respectively and the construction of the windings or of the coils with which the windings are realized respectively is simplified.

In accordance with a first exemplary embodiment, the drive winding and the control winding are designed as separate, which means physically different, windings. The drive winding and the control winding comprise in each case six concentrated coils, with one coil of the drive winding and one coil of the control winding being wound around each stator tooth. In this exemplary embodiment the drive winding and the control winding are in each case designed to be three-phased, which has the advantage that they can in each case be operated with a conventional rotary current controller.

In a second exemplary embodiment, the drive winding and the control winding are realized with the same coils. In this exactly one coil is provided on each stator tooth. Each coil can be controlled separately and independently of the other coils. These six coils thus function both as drive winding and as control winding. The currents which are required for the production of the rotary control field and of the rotary drive field are calculated for each coil, then computationally superimposed and fed in into the corresponding coil.

In the following the invention will be explained in more detail with reference to exemplary embodiments and with reference to the drawings.

DESCRIPTION OF THE PREFERRED EMBODIMENTS

Figure 1:
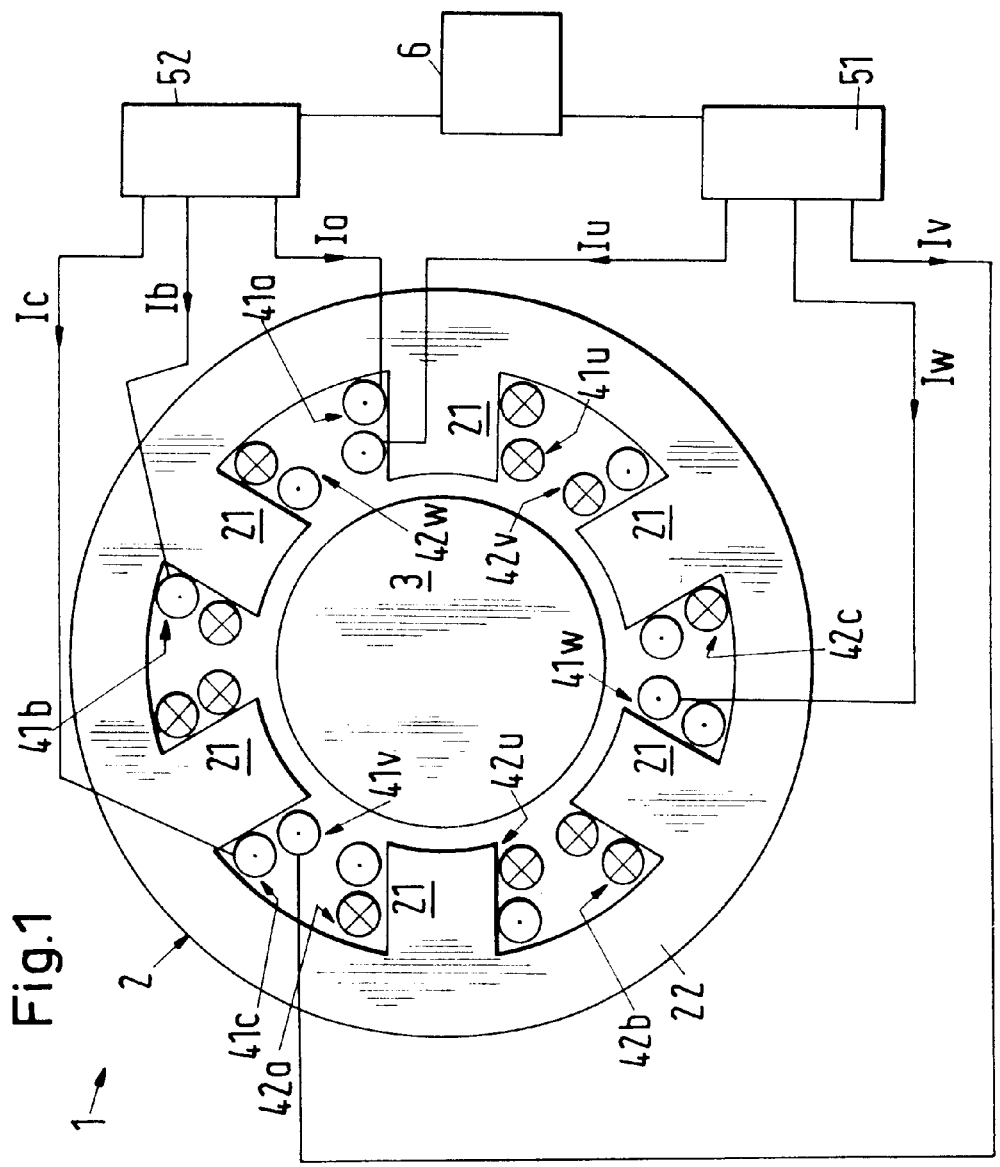
FIG. 1 depicts a first exemplary embodiment of the rotary drive in accordance with an embodiment of the present invention.

FIG. 1 shows in a schematic illustration a first exemplary embodiment of the electromagnetic rotary drive in accordance with an embodiment of the present invention, which is provided in its entirety with the reference symbol 1. The rotary drive 1 comprises a stator 2 and a magnetically journalled rotor 3 which is surrounded by the stator 2.

In accordance with the principle of the bearingless motor, the stator 2, which is designed as a bearing and drive stator, comprises a drive winding for producing a magnetic rotary drive field which causes a torque on the rotor 3 and which drives the latter and a control winding for producing a magnetic rotary control field by means of which the radial position of the rotor 3 can be regulated, with the numbers of pole pairs of the two windings differing by one. Through the combination of the two magnetic rotary fields, the rotor 3 can be driven and magnetically journalled without contact in the stator 2.

As will be explained further below, one of the two windings, here the drive winding, has a number of pole pairs equal to one, which means that it is bipolar, and the other winding, here the control winding, has a number of pole pairs equal to two, which means that it is quadrupolar.

Figure 2:
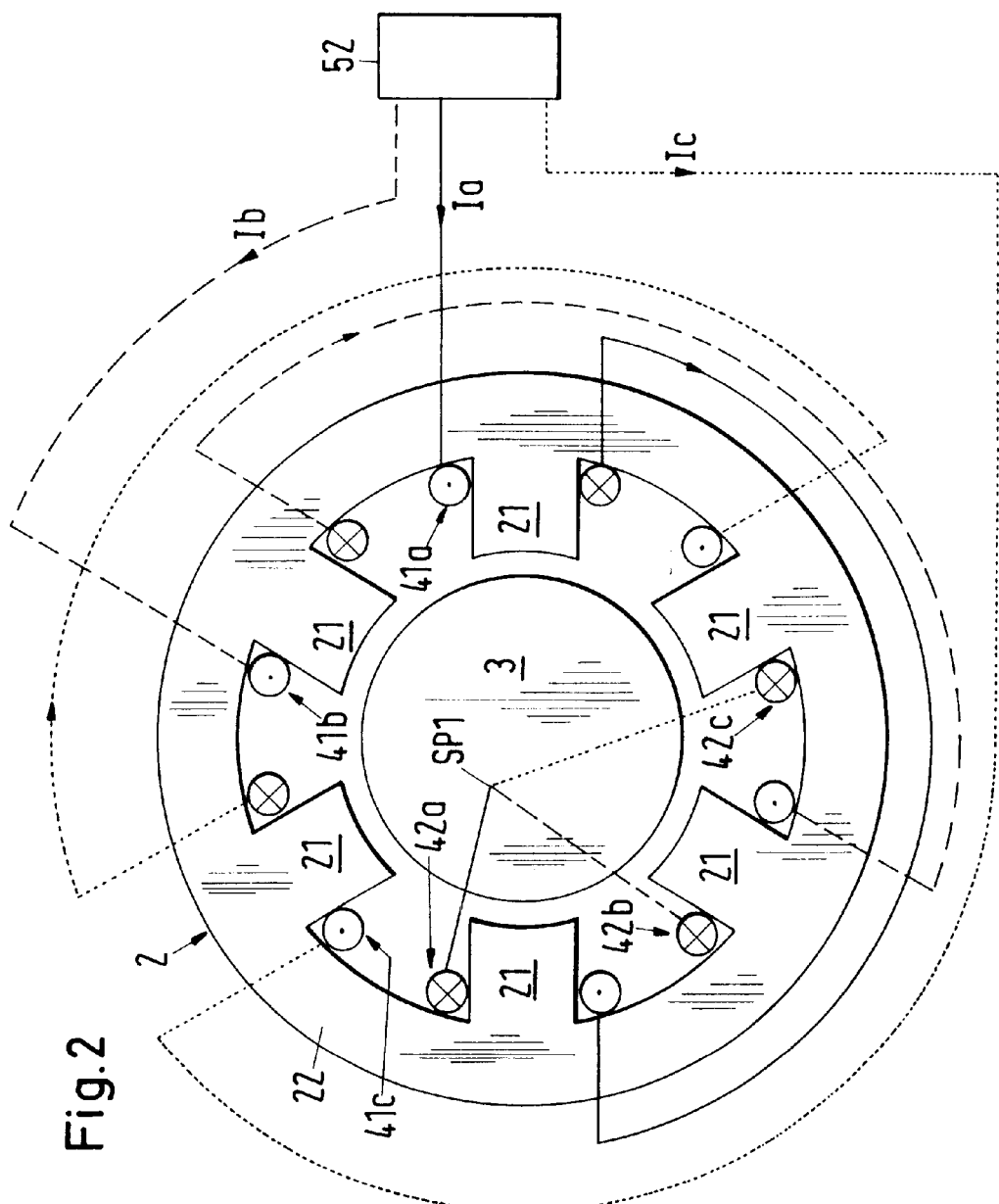
FIG. 2 depicts the stator and the rotor of the first exemplary embodiment, with only the winding with the number of pole pairs equal to two being shown.
Figure 3:
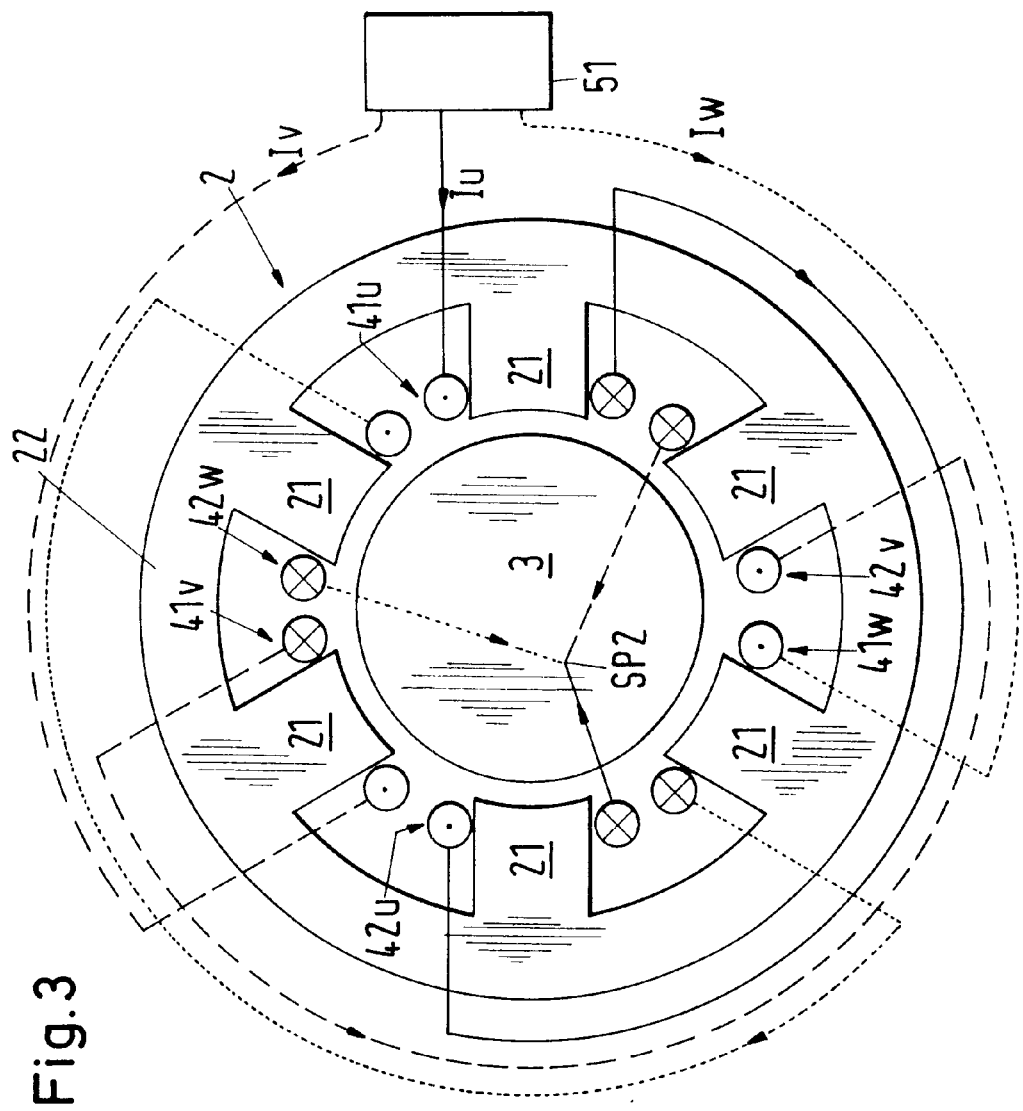
FIG. 3 depicts the stator and the rotor of the first exemplary embodiment, with only the winding with the number of pole pairs equal to one being shown.

In accordance with the invention the stator 2 comprises exactly six stator teeth 21. The stator teeth 21 are magnetically coupled to one another by means of a yoke 22, usually an iron yoke. The drive winding and the control winding are in each case realized by a plurality of concentrated windings which are wound around the stator teeth 21. In FIG. 1 all coils 41u, 42u, 41v, 42v, 41w, 42w, 41a, 42a, 41b, 42b, 41c, 42c are drawn in, with the connection of the coils not being illustrated in more detail for reasons of clarity. For a better understanding, FIG. 2 and FIG. 3 show the stator 2 and the rotor 3 of the first exemplary embodiment, with only the coils of the quadrupolar winding (here the control winding) being symbolically illustrated in FIG. 2 and only the coils of the bipolar winding (here the drive winding) being illustrated in FIG. 3. The winding sense of the individual coils is illustrated in accordance with convention by the two symbols ⊙ and ⓧ, with ⊙ meaning that a positive current flows forwardly out of the plane of the drawing and ⓧ that a positive current flows to the rear out of the plane of the drawing.

The control winding (see FIG. 2), which is designed here as a quadrupolar winding (number of pole pairs equal to two), comprises the six concentrated coils 41a, 42a, 41b, 42b, 41c, 42c. One of the concentrated coils 41a, 42a, 41b, 42b, 41c, 42c is provided on each stator tooth 21. The control winding is designed to be three-phased, which means that it comprises three winding loops or phases respectively, through which phase currents Ia, Ib and Ic flow. The coils 41a, 42a, 41b, 42b, 41c, 42c of the control winding are pair-wise electrically connected in series, with in each case those coils 41a, 42a or 41b, 42b or 41c, 42c respectively which are wound around diametrically oppositely lying stator teeth 21 being pair-wise connected. The coils 41a, 42a, which are connected in series, form the first winding loop of the control winding, and thus belong to the first phase and are flowed through by the phase current Ia (illustrated with a solid line). Analogously the second winding loop, which is flowed through by the phase current Ib (illustrated with a broken line), or the second phase respectively, comprises the coils 41b, 42b, and the third winding loop (phase current Ic, illustrated with a dotted line), or the third phase respectively, comprises the two coils 41c, 42c.

As FIG. 2 shows, the coils 41a, 42a or 41b, 42b or 41c, 42c respectively of the control winding, which are pair-wise connected, are always wound in mutually opposite senses, which means that the coil 41a is wound in the sense opposite to that of the coil 42a. The same holds for the coil pair 41b, 42b and for the coil pair 41c, 42c.

The three electrical phases of the control winding are connected in a star point circuit in this exemplary embodiment, which means that three-phase currents Ia, Ib, Ic flow together in a common star point SP1.

Naturally embodiments are also possible in which the three phases of the control winding are connected in a triangular circuit.

The drive winding (see FIG. 3), which is designed here as a bipolar winding (number of pole pairs equal to one), comprises the six concentrated coils 41u, 42u, 41v, 42v, 41w, 42w. One of the concentrated coils 41u, 42u, 41v, 42v, 41w, 42w is provided on each stator tooth 21. The drive winding is thus designed in the first exemplary embodiment as a separate winding, which means that it is realized with coils different from those of the control winding. The drive winding is designed to be three-phased, which means that it comprises three winding loops or phases respectively which are flowed through by phase currents Iu, Iv and Iw. The coils 41u, 42u, 41v, 42v, 41w, 42w of the drive winding are pair-wise electrically connected in series, with in each case those coils 41u, 42u and 41v, 42v and 41w, 42w respectively which are wound about diametrically oppositely lying stator teeth 21 being pair-wise connected. The coils 41u, 42u, which are connected in series, form the first winding loop of the drive winding, and thus belong to the first phase and are flowed through by the phase current Iu (illustrated with a solid line). Analogously the second winding loop, which is flowed through by the phase current Iv (illustrated with a broken line), or the second phase respectively, comprises the coils 41v, 42v, and the third winding loop (phase current Iw, illustrated with a dotted line), or the third phase respectively, comprises the two coils 41w, 42w.

As FIG. 3 shows, the pair-wise connected coils 41u, 42u and 41v, 42v and 41w, 42w respectively of the drive winding are always wound in mutually the same sense, which means that the coil 41u is wound in the same sense as the coil 42u. The same holds for the coil pair 41v, 42v and for the coil pair 41w, 42w.

The three electrical phases of the drive winding are connected in a star point circuit in this exemplary embodiment, which means that the three-phase currents Iu, Iv, Iw flow together in a common star point SP2.

Naturally embodiments are possible in which the three phases of the drive winding are connected in a triangular circuit.

It is self-evident that the coils of the control winding and/or of the drive winding, which are connected together pair-wise, can also be electrically connected in parallel.

For the power supply of the drive winding and of the control winding a controller device 51 and 52 respectively is in each case provided which feeds the phase currents Iu, Iv, Iw and Ia, Ib, Ic respectively into the respective winding loop.

Since in the first exemplary embodiment both the drive winding and the control winding are designed to be three-phased and the individual phases are in each case operated in a star point circuit or in a triangular circuit, a conventional and thus more economical rotary current controller can be used in each case as a controller device 51 for the drive winding and as a controller device 52 for the control winding.

A rotary current controller of this kind provides three-phase currents Ia, Ib, Ic and Iu, Iv, Iw respectively, with the three-phase currents in each case having a mutual phase shift of 120°.

Naturally the controller devices 51 and 52 can also be other apparatuses with power amplifiers, for example multiple phase current controllers with bridge branches, H-bridge switching amplifiers, other forms of switching amplifiers or analog amplifiers. Furthermore, it is possible to design the controller devices 51 and 52 as voltage controllers, so that a voltage imprinting into the individual winding loops takes place.

The controller devices 51 and 52 are controlled by a control device 6 (FIG. 1). The latter contains the evaluation and regulation units for the operation of the rotary drive 1. In the control device 6, the respective phase currents Ia, Ib, Ic and Iu, Iv, Iw respectively which are required are calculated by means of actual-desired value comparison for e.g. the rotor position, the speed of rotation, the torque or the rotor angle. The controller devices 51, 52 are then controlled in such a manner that they imprint these phase currents into the corresponding winding loops of the drive or control winding. The sensor apparatus which is usually provided for the driving and position regulation of the rotary drive 1, which is designed as a bearingless motor, such as for example position sensors or field sensors for the determination of the rotor angle, and the regulations structures for the bearingless motor are sufficiently known per se and are therefore not illustrated in the drawings. Some possible regulation structures for the bearingless motor are for example described in WO-A-95/18925. Therefore the design of the regulation and the sensor apparatus will not be discussed further here.

In the following it will now be described how the bipolar rotary drive field and the quadrupolar rotary control field are generated during the operation of the rotational drive.

For the rotary control field (see FIG. 2) the considerations will be restricted at first to one phase, for example the first phase with the coils 41a, 42a, which is charged with the phase current Ia. If, for example, it is assumed without restriction of the generality that the phase current Ia has just reached its positive maximum, then the stator tooth 21 which is surrounded by the coil 41a is a magnetic north pole. Since the second coil 42a of the first phase is wound oppositely to the coil 41a, the stator tooth 21 which is surrounded by the coil 42a is also a magnetic north pole. As a result of the magnetic flux which flows from these two north poles across the air gap to the rotor 3 and is conducted back from there via the other four stator teeth 21, namely those which are surrounded by the coils 41b, 42b, 41c, 42c of the second and third phase, these four stator teeth 21 behave as south poles. Magnetic south poles which are in each case weaker in magnitude than the north poles develop at these stator teeth 21. Through the phase current Ia, two north poles are thus generated at the diametrically oppositely lying stator teeth 21, which carry the coils 41a and 42a, and weakened south poles at the four stator teeth 21 which lie between them. As a consequence there exist a total of four pole changes when viewed over the entire periphery of the rotor, which means that the generated magnetic field is quadrupolar (number of pole pairs equal to two).

Analogous considerations hold for the other two phases, the phase currents Ib, Ic of which are phase shifted with respect to the first phase by 120° and by 240° respectively. As a consequence the rotary control field which is generated with the control winding is a magnetic rotary field with a number of pole pairs equal to two. The control winding is thus quadrupolar.

In the following it will now be explained that the drive winding (see FIG. 3) is bipolar (number of pole pairs equal to one). Let it be assumed without restriction of the generality that at a given time point the phase current Iu of the first phase has its positive maximum. This maximum is arbitrarily designated by the phase angle 0°, and is thus chosen as the zero point for the phase angle. Furthermore, let it be assumed for the sake of simplicity that all three-phase currents Iu, Iv, Iw respectively have the same amplitude.

The positive maximum of the phase current Iu causes the stator tooth 21 which is surrounded by the coil 41u to be a magnetic north pole. Since the diametrically oppositely lying second coil 42u of the first phase is wound in the same sense as the coil 41u, which is connected in series with it, the stator tooth 21 which is surrounded by the second coil 42u is a magnetic south pole (phase angle 180°).

The phase current Iv of the second phase is phase shifted with respect to the first phase by 120°, which means that at the time point under consideration the phase current Iv, which flows through the coil 41v, has the phase angle 120° and the phase current which flows through the coil 42v has the phase angle 300°. As a consequence a magnetic south pole develops at the stator tooth 21 which is surrounded by the coil 41v which is half as strong in magnitude as the north or south pole respectively which is generated by the first phase. Analogously, the stator tooth 21 which is surrounded by the coil 42v of the second phase is a magnetic north pole of half strength.

The phase current Iw of the third phase is phase shifted with respect to the phase current Iu of the first phase by 240°, which means that at the time point under consideration the phase current Iw, which flows through the coil 41w, has the phase angle 240° and the phase current which flows through the coil 42w has the phase angle 420° or 60° respectively. As a consequence a magnetic north pole which is half as strong in magnitude as the north or south pole respectively which is generated by the first phase develops at the stator tooth 21 which is surrounded by the coil 41w. Analogously, the stator tooth 21 which is surrounded by the coil 42w of the second phase is a magnetic south pole of half strength.

If one now regards the periphery of the rotor 3 clockwise and starting at the coil 41u, then the magnetic pole sequence N–1/2N–1/2N–S–1/2S–1/2S results (with N standing for north pole and S for south pole). There thus exist a total of two pole changes. As a consequence the rotary drive field which is generated with the drive winding is a magnetic rotary field with a number of pole pairs equal to one. The drive winding is thus bipolar.

In the above-described manner a winding having a number of pole pairs equal to two and a winding having a number of pole pairs equal to one can be realized in the stator 2, which has exactly six stator teeth 21, so that the rotary drive 1 can be operated in accordance with the principle of the bearingless motor, with both the drive field and the control field being magnetic rotary fields.

It should be emphasized that the control winding and the drive winding are interchangeable, which means that it is just as well possible to use the bipolar winding as a control winding and the quadrupolar winding as a drive winding.

Figure 4:
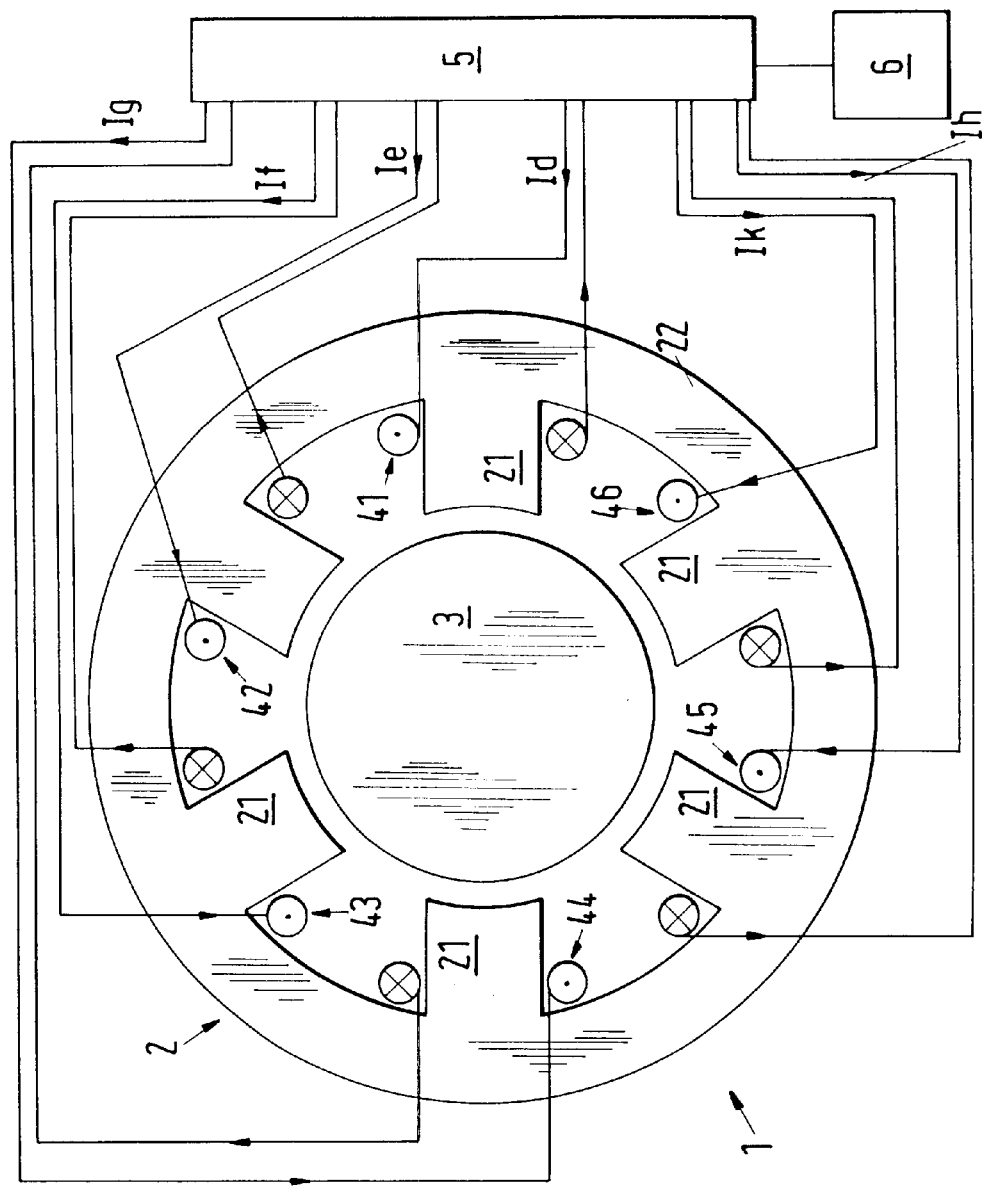
FIG. 4 depicts a second exemplary embodiment of the rotary drive in accordance with an embodiment of the present invention.

FIG. 4 shows a second exemplary embodiment of the rotary drive 1 in accordance with the invention. In the following only the differences from the first exemplary embodiment will be discussed in more detail; otherwise the explanations with respect to the first exemplary embodiment hold analogously for the second exemplary embodiment as well.

In the second exemplary embodiment exactly one coil 41, 42, 43, 44, 45, 46 is provided on each stator tooth 21, which means that the two coils which are in each case wound around a stator tooth in the first exemplary embodiment are replaced by one coil in the second exemplary embodiment.

The six concentrated coils 41–46 serve both for realizing the drive winding and for realizing the control winding. Each of the six coils 41–46 can be controlled separately and independently of the other coils, which means that the currents Id, Ie, If, Ig, Ih, Ik which are imprinted into the coils 41–46 can be regulated or set respectively independently of one another. For this, for example, each of the coils 41–46 is connected with its in each case two connectors to a controller device 5 in which a separate bipolar power amplifier is provided for each coil 41–46. Naturally other embodiments are also possible; what is important is however that the current for each coil 41–46 can be regulated independently of the currents for the other coils and each current and each voltage can take on a positive and a negative sign.

In the operating state the control device 6 establishes for each coil the phase current Ia, Ib or Ic respectively which is required for the control winding and the phase current Iu, Iv, Iw which is required for the drive winding, with the designations of the currents having the same meaning as in the first exemplary embodiment. For each coil 41–46 then the associated phase current for the drive winding Iu or Iv or Iw respectively and the associated phase current for the control winding Ia or Ib or Ic respectively are superimposed, for example computationally, taking the signs into consideration, from which the resultant current Id or Ie, etc. respectively results. The latter is then fed in into the corresponding coil.

Through a comparison of FIGS. 2, 3 and 4 the following currents result for the six coils 41–46:

Coil 41: Id=Ia+Iu

Coil 42: Ie=Ib−Iw

Coil 43: If=Ic+Iv

Coil 44: Ig=Ia−Iu

Coil 45: Ih=Ib+Iw

Coil 46: Ik=Ic−Iv

In this way a bipolar, three-phased rotary field winding and a quadrupolar, three-phased rotary field winding can be generated in a manner analogous to that of the first exemplary embodiment. Here as well either the winding with the number of pole pairs equal to one can be used as the drive winding, that is, for producing the rotary drive field, and the winding with the number of pole pairs equal to two as the control winding, that is, for producing the rotary control field, or vice versa, the winding with the number of pole pairs equal to one as the control winding and the winding with the number of pole pairs equal to two as the drive winding.

A particular advantage of the second exemplary embodiment is to be seen in that the rotary drive 1, which is designed as a bearingless motor, still remains capable of functioning even in the event of the failure of up to two coils or of the components of the controller device 5 which supply them, through which a fault tolerance is realized.

An essential aspect of the rotary drive 1 in accordance with the invention is to be seen in that with only six stator teeth 21 or with only six grooves between the stator teeth 21 respectively two rotary field windings can be realized, the numbers of pole pairs of which differ by one. In this, separate coils can in each case be provided for the two windings, as in the first exemplary embodiment, or both windings can be realized with physically the same coils.

The rotor 3 of the rotary drive in accordance with the invention can in principle be freely chosen. It can for example be a permanent magnet rotor, or a short circuit cage rotor or a reluctance rotor.

The rotor 3 can for example be a disc-shaped or ring-shaped rotor or else a shaft, by means of which for example the running wheel of a pump, a spindle or any other apparatus is driven. If the rotor is a shaft, then for example two rotary drives 1 in accordance with the invention can be provided and/or additional magnetic radial and/or axial bearings can be provided.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An electromagnetic rotary drive, designed as bearingless motor, the electromagnetic rotary drive comprising:
a magnetically journalled rotor, wherein the magnetically journalled rotor is a permanent magnet rotor; and
a stator, wherein the stator comprises:
a drive winding for producing a magnetic rotary drive field that produces a torque on the rotor, wherein the drive winding includes a number of pole pairs equal to one; and
a control winding for producing a magnetic rotary control field that is usable to regulate the position of the rotor with respect to the stator, wherein the stator has exactly six stator teeth.

2. Rotary drive in accordance with claim 1, wherein the control winding has a number of pole pairs equal to two.

3. Rotary drive in accordance with claim 1, wherein the drive winding is designed to be three-phased.

4. Rotary drive in accordance with claim 1, wherein the control winding is designed to be three-phased.

5. Rotary drive in accordance with claim 1, comprising at least one concentrated coil on each stator tooth.

6. Rotary drive in accordance with claim 1, wherein the drive winding and the control winding are designed as separate windings.

7. Rotary drive in accordance with claim 6, wherein the drive winding and the control winding in each case comprise six concentrated coils, with exactly one coil of the drive winding and exactly one coil of the control winding being wound around each stator tooth.

8. Rotary drive in accordance with claim 6, wherein coils of the drive winding are electrically connected pair-wise in series and coils of the control winding are electrically connected pair-wise in series, with in each case those coils that are wound around diametrically oppositely lying stator teeth being pair-wise connected.

9. Rotary drive in accordance with claim 8, wherein the coils of the one winding are connected pair-wise and being wound in mutually opposite senses and wherein the coils of the other winding are connected pair-wise and being wound in mutually the same sense.

10. Rotary drive in accordance with claim 1, wherein exactly one coil is provided on each stator tooth, each coil being controllable separately and independently of the other coils, and with the drive winding being realized with the same coils as the control winding.

* * * * *